US012751364B2

(12) United States Patent
Singh et al.

(10) Patent No.: US 12,751,364 B2
(45) Date of Patent: Oct. 6, 2026

(54) DEVICES AND METHODS FOR AUTOMATED CONCAVE COVERS

(71) Applicant: Deere & Company, Moline, IL (US)

(72) Inventors: Rana Shakti Singh, Ramgarh (IN); Nathan R. Vandike, Geneseo, IL (US); Shivani Magdum, Pandharpur (IN)

(73) Assignee: DEERE & COMPANY, Moline, IL (US)

( * ) Notice: Subject to any disclaimer, the term of this patent is extended or adjusted under 35 U.S.C. 154(b) by 402 days.

(21) Appl. No.: 18/407,828

(22) Filed: Jan. 9, 2024

(65) Prior Publication Data

US 2025/0221337 A1 Jul. 10, 2025

(51) Int. Cl.
*A01D 41/127* (2006.01)

(52) U.S. Cl.
CPC ................................ *A01D 41/1273* (2013.01)

(58) Field of Classification Search
CPC ................................................. A01D 41/1273
See application file for complete search history.

(56) References Cited

U.S. PATENT DOCUMENTS

| | | | | |
|---|---|---|---|---|
| 1,857,265 | A | 5/1932 | Stephens | |
| 10,905,050 | B2 | 2/2021 | Robertson | |
| 11,467,605 | B2 * | 10/2022 | Palla | A01D 41/1278 |
| 11,497,171 | B2 | 11/2022 | Theisen et al. | |
| 11,510,369 | B2 * | 11/2022 | Bortner | A01D 41/127 |
| 2016/0000008 | A1 * | 1/2016 | Schøler | A01D 41/1272 56/10.2 R |
| 2017/0235471 | A1 * | 8/2017 | Schøler | G01F 1/666 715/772 |
| 2022/0201934 | A1 * | 6/2022 | Koch | A01D 41/127 |

FOREIGN PATENT DOCUMENTS

| | | | | |
|---|---|---|---|---|
| EP | 0085358 A1 | 8/1983 | | |
| EP | 0092599 A1 | 11/1983 | | |
| EP | 2837279 B1 * | 6/2021 | | A01D 41/127 |
| WO | WO-2019063218 A1 * | 4/2019 | | A01F 12/28 |

* cited by examiner

*Primary Examiner* — Claude J Brown

(57) ABSTRACT

Provided are devices and methods for automated concave covers. A harvesting machine of the present invention may include at least one concave cover that is movable between at least two positions. The harvesting machine may include an electronic control system having sensor(s), processor(s), at least one memory, and actuator(s). The electronic control system may receive information from sensor(s), determine a current position of the concave cover, and determine whether to move the concave cover to a different position. If it is determined to move the concave cover to a different position, actuator(s) may be directed to initiate movement. Also provided is a computer-implemented method.

17 Claims, 6 Drawing Sheets

DEVICES AND METHODS FOR AUTOMATED CONCAVE COVERS

TECHNICAL FIELD

The present disclosure relates generally to combine harvesters for crop harvesting. More particularly it relates to controlling one or more covers of a concave.

BACKGROUND

Combines, or sometimes combine harvesters or harvesters, serve to harvest crop(s) at the end of an agricultural season. Combines are so named because they combine several tasks necessary to process a crop, such as a grain crop, at harvest. For example, a combine may cut, thresh, and clean the crop. A combine may include several subsystems, including, but not limited to, a header or implement, a threshing section, a separating section, a cleaning shoe, a tailings section, a clean grain tank, and a residue handling section. Each of these subsystems may in turn include several components. A combine operator may operate the combine from an operator station, such as a cabin or cab. The threshing section may include a rotor having one or more threshing projections. The rotor may be at least partially surrounded by one or more concave(s). The concave(s) may include one or more covers.

SUMMARY

According to an aspect of the present disclosure, provided are embodiments of a harvesting machine. A harvesting machine of the present invention may include a threshing section having a rotor, concave, and at least one concave cover movable between at least two positions. The harvesting machine may further include an electronic control system having at least one sensor, at least one processor, at least one memory, and at least one actuator. The control system may be operable to receive information from the sensor(s), determine which of said at least two positions the concave cover is in, and determine whether to move said concave cover to another of said at least two positions based on the information received from the at least one sensor. If it is determined to move the concave cover to the other of the open and closed positions, then the control system may direct the at least one actuator to initiate movement of the concave cover. The sensor may be selected from the group consisting of an unthreshed grain sensor configured to detect unthreshed grain, a tailings sensor configured to detect at least one of the content or amount of tailings, a weed sensor configured to detect a characteristic of weeds in a crop, a feedrate sensor configured to detect the feedrate of material entering the harvesting machine, a residue sensor configured to detect at least one characteristic of a residue produced by the harvesting machine, a dust sensor configured to detect at least one characteristic of a dust produced by the harvesting machine, and a coverage area sensor configured to detect at least one characteristic of an area to be harvested by the harvesting machine.

In some embodiments, the harvesting machine may further include at least one sensor selected from the group consisting of a terrain sensor configured to detect at least one characteristic of the terrain over which the harvesting machine is traveling, a cleaning section loss sensor configured to detect at least one characteristic of grain lost in the cleaning section, and a grain quality sensor configured to detect at least one characteristic of grain in the clean grain section.

In some embodiments, the harvesting machine may further comprise at least one sensor selected from the group consisting of a separator loss sensor, a crop moisture sensor, a crop mechanics sensor, a plant health sensor, and an ambient condition sensor. Furthermore, in some embodiments, the concave cover may be movable between open, closed, and one or more partially open positions.

In some embodiments, the processor may include a monitor system module configured to interpret information received from the at least one sensor and a concave cover analyzer module configured to determine whether to move the concave cover to another of the at least two positions based on interpreted information from the monitor system. Moreover, in some embodiments, a speed of the rotor may be adjustable and the processor may include a rotor speed analyzer module configured to determine whether to adjust the rotor speed based on information received from the at least one sensor. An aggressiveness of the threshing section may be adjusted by at least one of moving the concave cover and adjusting the rotor speed. In some embodiments, the harvesting machine may further include a concave clearance between the rotor and the concave. The electronic control system may be operable to determine whether to adjust the concave clearance based on the information received from the at least one sensor.

In another embodiment of the invention, a computer-implemented method of controlling a concave cover of a harvesting machine performing a harvest operation is provided. The concave cover is movable between at least two positions. The method includes detecting one or more conditions of the harvesting operation. The method further includes determining a current position of the concave cover and determining whether to move the concave cover to a different position. If it is determined to move the concave cover to a different position, the control system may control an actuator to execute movement of the concave cover. The conditions may be selected from the group consisting of unthreshed grain, at least one of the amount and content of tailings, a characteristic of weeds in a crop, a feedrate of material into said harvesting machine, a characteristic of a residue produced by said harvesting machine, a characteristic of a dust produced by said harvesting machine, and a coverage area to be harvested by said harvesting machine.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

The following is a detailed description of one or more embodiments of technology, including systems, methods, and apparatuses, for automatically controlling one or more concave covers of an agricultural harvester.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Moreover, sometimes terms such as "above," "below," "upward," "downward," "top," "bottom," etc., will also be used in connection with describing the combine harvester as it is oriented when it sits on the ground in its customary operating mode. However, these terms are again used for description purposes and do not represent limitations on the scope of the disclosure, unless required by the claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
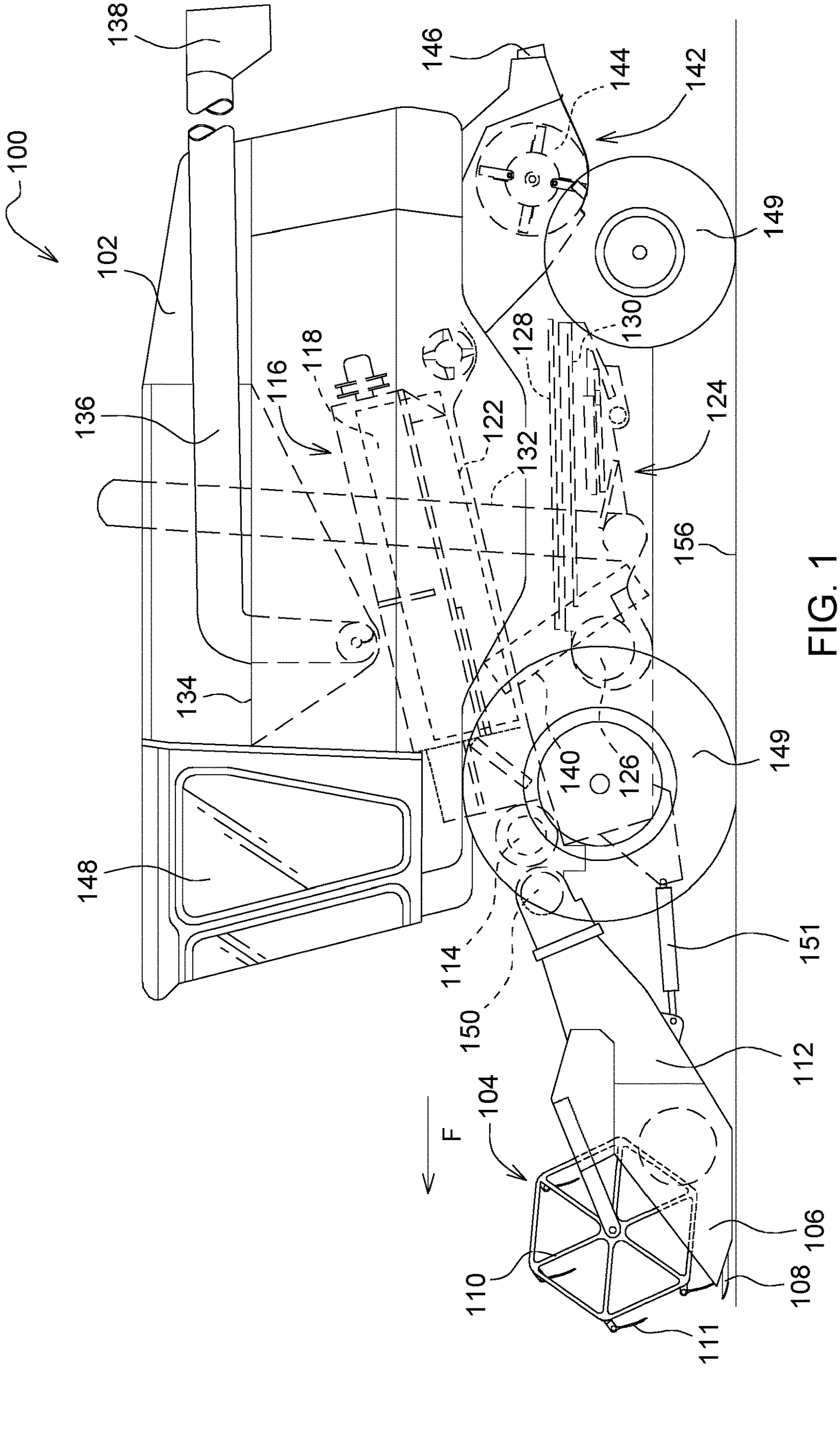
FIG. 1 is an elevation view showing the side of an embodiment of a combine harvester.

Referring to FIG. 1, an exemplary agricultural harvester 100 (sometimes "harvester") is shown. The illustrated harvester 100 serves to cut and process crop products, including but not limited to grains, from a field. In some embodiments, the agricultural harvester 100 is configured to move in a forward direction of travel F through a crop field to harvest plants, such as crops planted in rows. The crop field may include varying terrain, including but not limited to hills and valleys. Moreover, the field may be any shape. The illustrated agricultural harvester 100 is a combine harvester. As noted above, combine harvesters are so named because they combine two or more tasks associated with harvesting a crop. The illustrated harvester shows components associated with at least the following tasks: gathering crop, severing or cutting crop, threshing, separating crop products (e.g., grain) from crop residue (e.g., material other than grain), cleaning (or further separating) crop products, processing tailings, and processing crop residue. However, agricultural harvesters having fewer, more, and/or different functions are included in the scope of this invention.

Referring to the gathering and severing functions, harvester 100 may include an implement 104 (sometimes called a head or header) including a gathering section and a cutting section to gather and cut crop, respectively. FIG. 1 illustrates a harvester 100 having a draper head 106, which is typically suited for harvesting crops such as small grains (e.g., wheat, barley), large grains (e.g., soybeans, peas, beans), grasses, and pulse crops (e.g., lentils). Other types of non-illustrated implements may be used without departing from the scope of this invention, including but not limited to a corn head. The illustrated draper head 106 includes a cutter 108 and reel 110 which serve to sever and gather crops, respectively. The reel 110, illustrated as having a plurality of tines 111, engages the crop to be cut and gathers it toward the cutter 108. In the draper head of FIG. 1, the cutter 108 may include one or more knives or blades (not shown). The cut portions of the crop may be moved towards a feeder house 112, which may be located near the center of the implement 104. Movement towards the feeder house 112 may be via one or more conveyer belts, augers, or other means (not shown). The cut portions of the crop may be moved from the feeder house 112 to a feed accelerator 114 and into the body 102 of the combine.

The cut portion of the crop may include grain and material other than grain. When the cut portion of the crop enters the body 102, the grain may be attached to the material other than grain or a portion thereof. In the body of the combine, the cut portions of the crop are first introduced to a threshing section or thresher 116. The threshing section 116 removes the grain from the portion of the plant to which it is attached (e.g., the threshing section may separate one or more corn kernels from a cob or one or more soybeans from a pod). Once the grain is detached, the material other than grain may be referred to as residue or crop residue. The threshing section 116 typically includes a rotor 118 with a plurality of threshing projections 152 extending therefrom. The cut material may move through a separating section 122 to separate threshed grain from material other than grain.

After the separating section 122, grain typically moves through a cleaning section, sometimes referred to as a cleaning shoe, 124. The cleaning section 124 may include a cleaning fan 126, chaffer 128, and a sieve 130 which work in combination to separate grain from comparatively similar sized pieces of crop residue that were not separated from the grain in the separating section 122. After the cleaning section 124, grain may either be clean, in which case it follows the path of clean grain, or it may require further processing. If grain is clean, it moves to a clean grain elevator 132, which may be any type, including but not limited to an auger or a conveyer. The clean grain elevator 132 moves clean grain to a clean grain tank 134. The clean grain may be moved from the clean grain tank 134 via an unloading auger 136 and spout 138. On the other hand, the grain may require further processing, such as in the case of incompletely threshed grain. Such grain requiring further processing after the cleaning section 124 is commonly referred to as tailings. The tailings may move to the tailings elevator 140, which may be any type, including but not limited to an auger or a conveyer. The tailings elevator 140 may move the tailings back to the threshing section 116 to be further processed. Alternatively, in some harvesters 100 a separate tailings section (not shown) may further thresh and process the tailings. Crop residue may move through a residue handling section 142, which may include a chopper 144 and spreader 146. The residue handling section 142 ultimately discharges crop residue out of the harvester 100 back onto the field via the spreader 146.

The harvester 100 components associated with gathering and severing crops are typically housed on implement 104. The remaining functions of the harvester 100 are typically housed in the body 102 of the harvester. The body 102 of the harvester may also include an operator station 148, engine (not shown), and ground engaging mechanism, such as one or more wheels 149 or one or more track assemblies (not shown). The ground engaging mechanism(s) are configured to engage and travel over the ground 156. The harvester 100 may also include a control system, which may be housed anywhere (including in multiple locations) and will be discussed in further detail below. Often, the control system may be accessed by an operator in the operator station. The implement 104 is typically selectively removable from the body 102 of the harvester. The implement 104 may be pivotable with respect to the body 102, such as via pivot 150. The pivoting movement may be aided by at least one implement support 151 which in the illustrated embodiment is a hydraulic support but may be of any type. To that end, implements, sometimes called headers or heads, may be interchangeable. Therefore, the same harvester 100 may be used to harvest a plurality of crops and crop products. For example, implements may include, but are not limited to, corn heads and draper heads.

Figure 2:
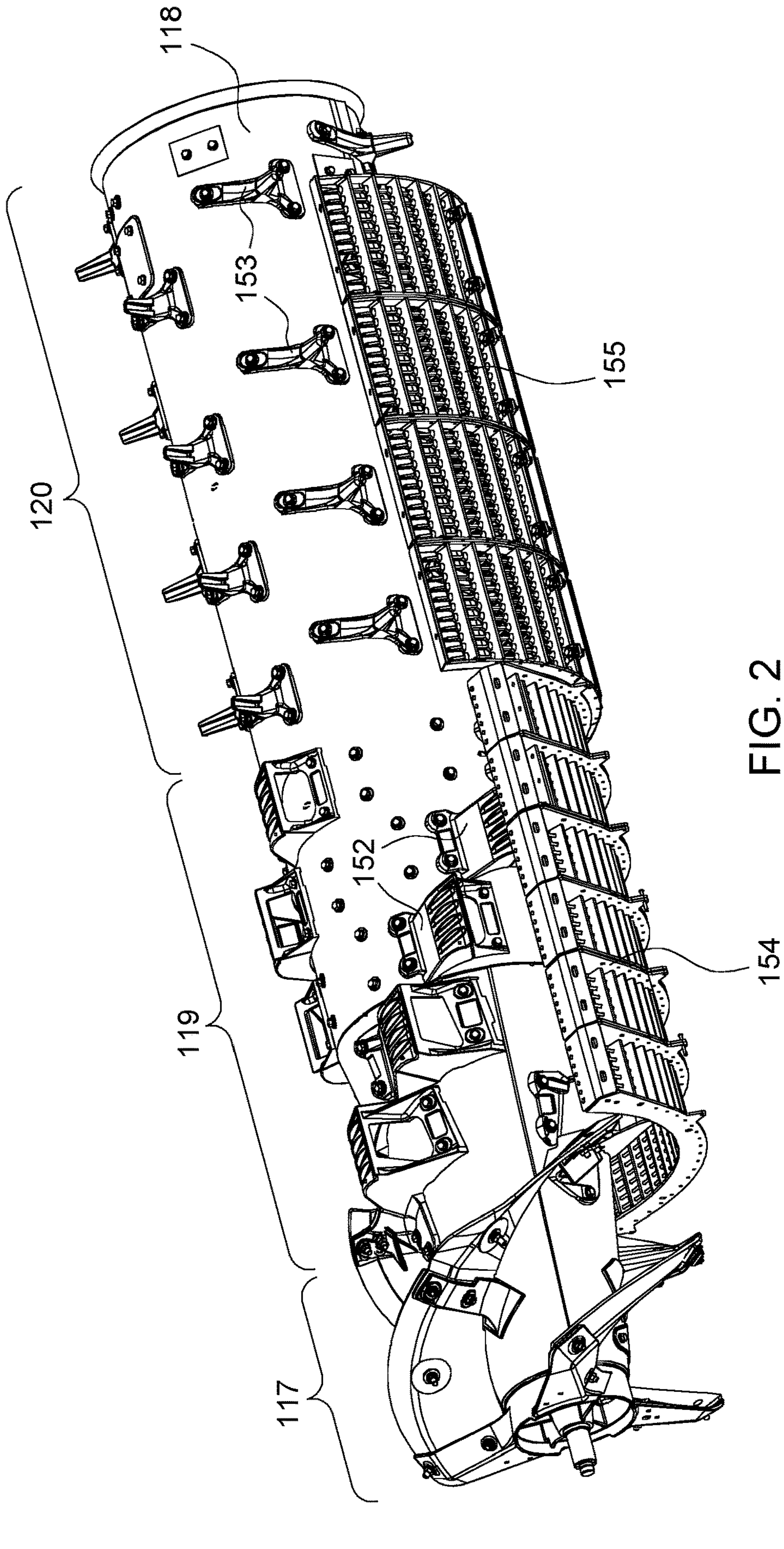
FIG. 2 is a perspective view of an embodiment of a rotor with threshing projections and a concave of the present invention.

Turning to FIG. 2, a portion of the threshing section 116 is shown in more detail. Shown is the rotor 118 having at least one threshing projection 152. In some embodiments, the rotor includes a plurality of threshing projections 152. The rotor 118 may be divided into three portions. The first is a feed portion 117. The second is a threshing portion 119, and the third is a separating portion 120. The feed portion 117 receives material that has entered the body 102 and feeds it further into the threshing section 116. The threshing portion 119 includes threshing projections 152 that may grind the cut crop to detach the grain from material other than grain. The separating portion 120 includes tines 153 which separate the grain (and similarly sized pieces of material other than grain) from large pieces of material other than grain, including but not limited to large straw. This separating portion 120, tines 153, and separator grate 155 are components of the separating section 122 discussed above.

Also shown is a concave 154 that at least partially surrounds the rotor 118 threshing portion 119 and projections 152. In some embodiments, including the illustrated embodiment, the concave 154 partially surrounds the rotor 118 and projections 152 and is located underneath the rotor 118 and projections 152. Cut crop material may enter the threshing section 116 via the feeder house 112 and feed accelerator 114. In some embodiments, the rotor 118 and concave 154 are housed within a threshing cavity (not shown). The threshing cavity is appropriately sized such that when the rotor 118 turns, the cut crop is subjected to the threshing projections 152 and the desirable crop product(s) (typically grain) is freed from the portion of the plant to which the product is attached (e.g., corn cob, soybean pod, wheat head). The cavity is appropriately sized such that removed crop products may fall via gravity through the concave 154. The rotor 118 turns or spins, while the concave 154 and separator grate 155 remain relatively stationary underneath the rotor 118. The rotor speed, sometimes referred to as the threshing speed, may be variable. Varying the rotor speed may vary the aggressiveness of the threshing operation. As described hereinbelow, there may be circumstances where either increased or decreased threshing aggressiveness may be desired. Such aggressiveness may be varied by one or more of adjusting the rotor speed and adjusting the position of concave covers, which will be described in detail below. Moreover, threshing aggressiveness may be varied by adjusting the concave clearance, which is the space between the rotor 118 and the concave 154.

Figure 3:
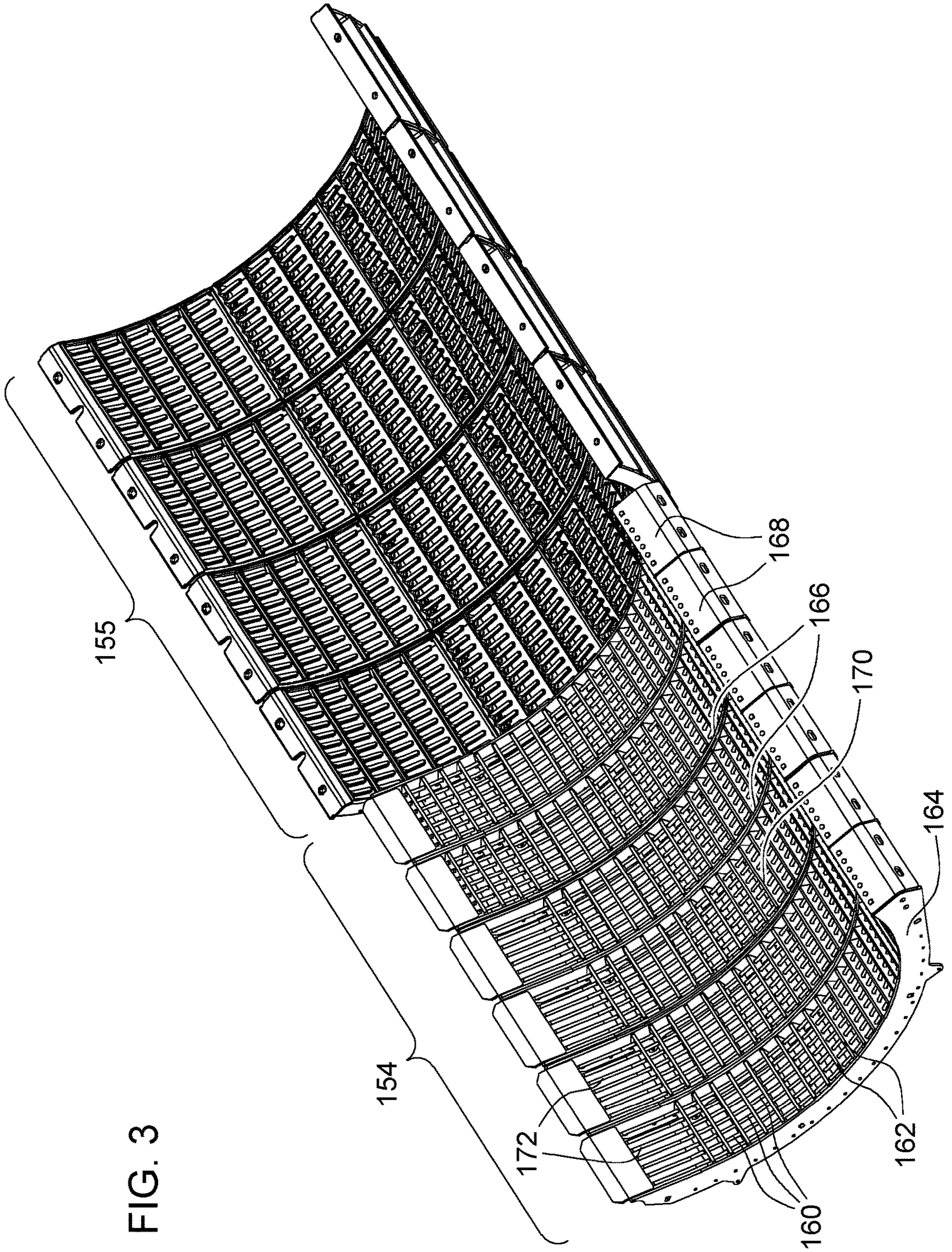
FIG. 3 is a perspective view of an embodiment of a concave and separator grate of the present invention.

An exemplary concave 154 and separator grate 155 are also shown in FIG. 3. The concave includes a plurality of lateral members 160 and a plurality of longitudinal members 162. The lateral members 160 and longitudinal members 162 may be aligned to create a grid 170. Moreover, the lateral members 160 and longitudinal members 162 may be supported by a frame 164 having one or more lateral frame members 166 and one or more longitudinal frame members 168. The grid 170 may act as a sieve to allow crop product, such as grain, to fall through while retaining cut crop material too large to fall through the grid separate from the crop product. The lateral frame members 166 may be spaced apart to form one or more bays 172.

Figure 4:
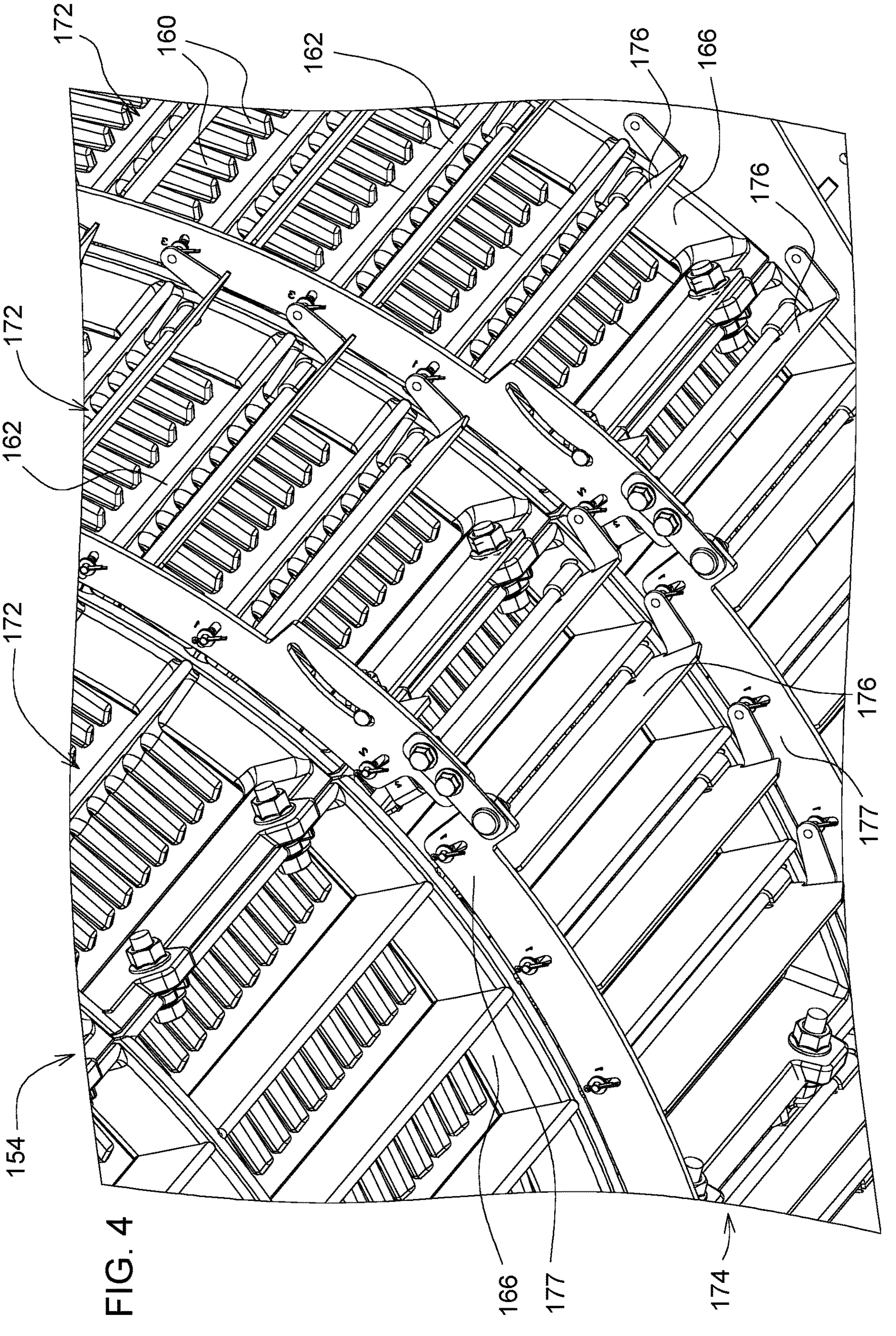
FIG. 4 is a perspective view of an embodiment of a plurality of concave covers of the present invention.

The threshing section 116 may further include one or more concave covers 174. Concave covers 174 may take many forms. FIG. 4 shows one embodiment of one or more concave covers 174 of the present invention. Shown in FIG. 4 are lateral frame members 166 forming concave bays 172. FIG. 4 shows a plurality of flaps 176 that serve as concave covers. One or more of the flaps 176 may be connected to one or more flap frames 177. The flap frames 177 may be movable. Movement of the flap frames 177 may cause the attached flaps 176 to move between open, closed, and partially open positions. The embodiment of covers shown in FIG. 4 is illustrative only and should not be construed to limit the scope of concave covers covered by the present invention.

Concave covers, whether those illustrated in FIG. 4 or other embodiments, may have open and closed positions. In addition, concave covers may have partially open positions. In the open position, the cover allows crop product to fall through the concave grid 170 for further processing in other parts of the harvester 100. In the closed position, the cover prevents the crop product from falling through the concave grid 170, and, therefore, the material (e.g. crop product, cut crop material) is retained in the threshing section 116 for a longer period of time. A partially open position may result in an intermediate effect. The retained material (e.g., crop product, cut crop material) is subjected to the rotor 118 threshing portion 119 and threshing projections 152 for a longer period of time. Such retention may be desirable in one or more situations, as described below.

Moving the covers between open and closed positions may be controlled by a control system 200 which controls one or more aspects of the combine harvester 100 during a harvesting operation. The control system 200 may be located at one or more locations on the harvester 100 or remote from the harvester 100. In some embodiments, the control system 200 is a computer-implemented device that receives information, such as in the form of sensor data, analyzes the received data, and controls one or more aspects of the harvester 100 in response to the analysis. In the illustrated embodiment, the control system 200 includes one or more sensors that detect information related to whether one or more concave covers should be in the open, closed, or partially open positions. The sensors, described in further detail below, may be one or more of many types based on the information to be detected.

Figure 5:
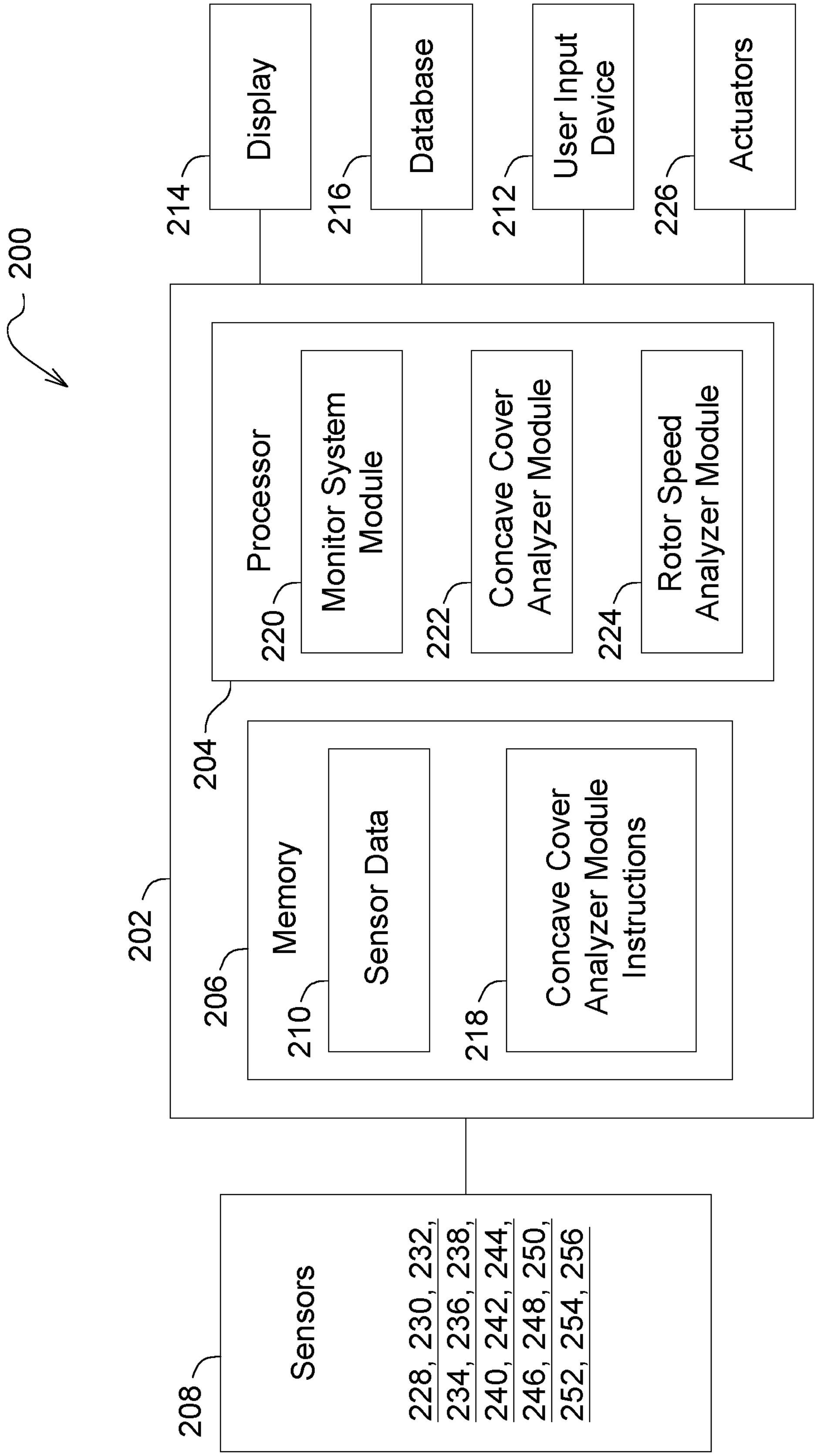
FIG. 5 is a schematic of an embodiment of a control system of the present invention.

FIG. 5 is a schematic of an example control system 200. The control system 200 may include a controller 202. The controller 202 includes a processor 204 that is communicatively coupled to a memory 206. The memory 206 communicates with the processor 204 and is used to store programs and other software and information (such as in the form of data). The processor 204 is operable to execute programs and software and receive information and send information to the memory 206. Although a single memory 206 and a single processor 204 are illustrated, in other embodiments, a plurality of memories, processors, or both may be used. Although the processor 204 and memory 206 are shown as being local components of the controller 202, in other embodiments, one or both of the processor 204 and memory 206 may be located remotely.

The control system 200 also includes one or more sensors 208 that capture and/or detect information related to the harvesting operation and which may be relevant to movement of one or more concave covers between the open, closed, and/or partially open positions. The data produced by the sensors may be collectively referred to as sensor data 210 and may include a wide variety of data and data formats. The sensors 208 are in communication with the controller 202 and transmit sensor data 210 to the controller 202.

The example control system 200 may also include or be coupled to a user input device 212. The user input device 212 may be any of a keyboard, keypad, joystick, mouse, scanner, camera, microphone, button, knob, touchscreen, or other type of input device that is operable to receive user input. The control system may also include or be coupled to a display 214. The display 214 may be operable to display information to a user, such as all or a portion of the sensor data 210 or a current concave cover position. The information displayed on the display 214 may be provided via a graphical user interface (GUI) (not shown). In some instances, the display 214 is a touch screen display and, in addition to displaying information, also operates as an input device 212. Information provided in GUI may be via any mode, e.g., text (letters, numbers, etc.), graphics, symbols, colors, objects, patterns, flashing objects, sounds, speech.

The example control system 200 may be communicably coupled to a database 216. The database 216 may be a form of mass storage device. The database 216 may be located locally, such as on the harvester 100, or may be located remotely. The database 216 stores data for later use, such as by controller 202 and the processor 204 thereof. The memory 206 may store data, such as sensor data 210. The memory also may also include concave cover analyzer module instructions 218 to enable the processor 204 and specifically a concave cover analyzer module 222 to carry out operations described in further detail below.

The processor 204 executes programs, such as the concave cover analyzer module 222. In some embodiments, the processor 204 also includes a monitor system module 220, and a rotor speed analyzer module 224. The controller 202 uses sensor data 210, alone or in combination with other information, to determine whether to actuate the opening or closing of one or more concave covers. To that end, the control system 200 may include or be communicably coupled to one or more actuators 226. The actuator(s) 226 are associated with one or more concave covers to alter a state or parameter of one or more covers. More specifically, the actuator(s) 226 may be configured to move one or more covers between open, closed, and/or partially open positions. The actuator(s) 226 may be any type, including, but not limited to, an electric linear actuator, hydraulic actuator, or a pneumatic actuator. The actuator(s) 226 may each be associated with one or more covers. In some embodiments, a single actuator may control all covers and in other embodiments, multiple actuators may control less than all of the covers present in the harvester.

In embodiments including a monitor system module 220, the monitor system module 220 may receive inputs or information from the sensor(s) and interpret that information to create a signal or input that is usable by the concave cover analyzer module 222. For example, in some embodiments, sensor(s) 208 may provide an image. The monitor system module 220 interprets the image into information that can be used by the concave cover analyzer module 222 in performing the analyses described below. As noted above, the processor 204 may also include a rotor speed analyzer module 224. The rotor speed analyzer module 224 determines whether to adjust the rotor speed to increase or decrease threshing aggressiveness based on the usable sensor input created by the combination of sensor(s) 208 and monitor system module 220. In some embodiments, the position of the rotor 118 and/or concave 154 may be adjustable such that the clearance between the two may be varied. This concave clearance may also affect the threshing aggressiveness. As such, some embodiments of the invention, including but not limited to a control system 200 and method 300 may include components and steps related to adjustment of the concave clearance.

FIG. 5 also shows a plurality of embodiments of sensors of the present invention. The illustrated sensors include unthreshed grain sensor(s) 228, separator loss sensor(s) 230, tailings sensor(s) 232, crop moisture sensor(s) 234, weed sensor(s) 236, terrain sensor(s) 238, feed rate sensor(s) 240, crop mechanics sensor(s) 242, plant health sensor(s) 244, residue sensor(s) 246, ambient condition(s) sensor(s) 248, dust sensor(s) 250, cleaning shoe loss sensor(s) 252, coverage area sensor(s) 254, and grain quality sensor(s) 256. It will be understood that each type of sensor shown in FIG. 5 may include one or more sensor(s) directed to each input. Moreover, one or more sensors may provide information related to more than one category of information. Furthermore, in addition to the sensor(s) shown in FIG. 5 and described below, one or more other sensors or inputs may be used by a control system 200 without departing from the scope of the present invention. In addition to the sensors, one or more parameters may be influenced by operator input, either in addition to sensor input or instead of sensor input. The sensors will be described in detail below.

Figure 6:
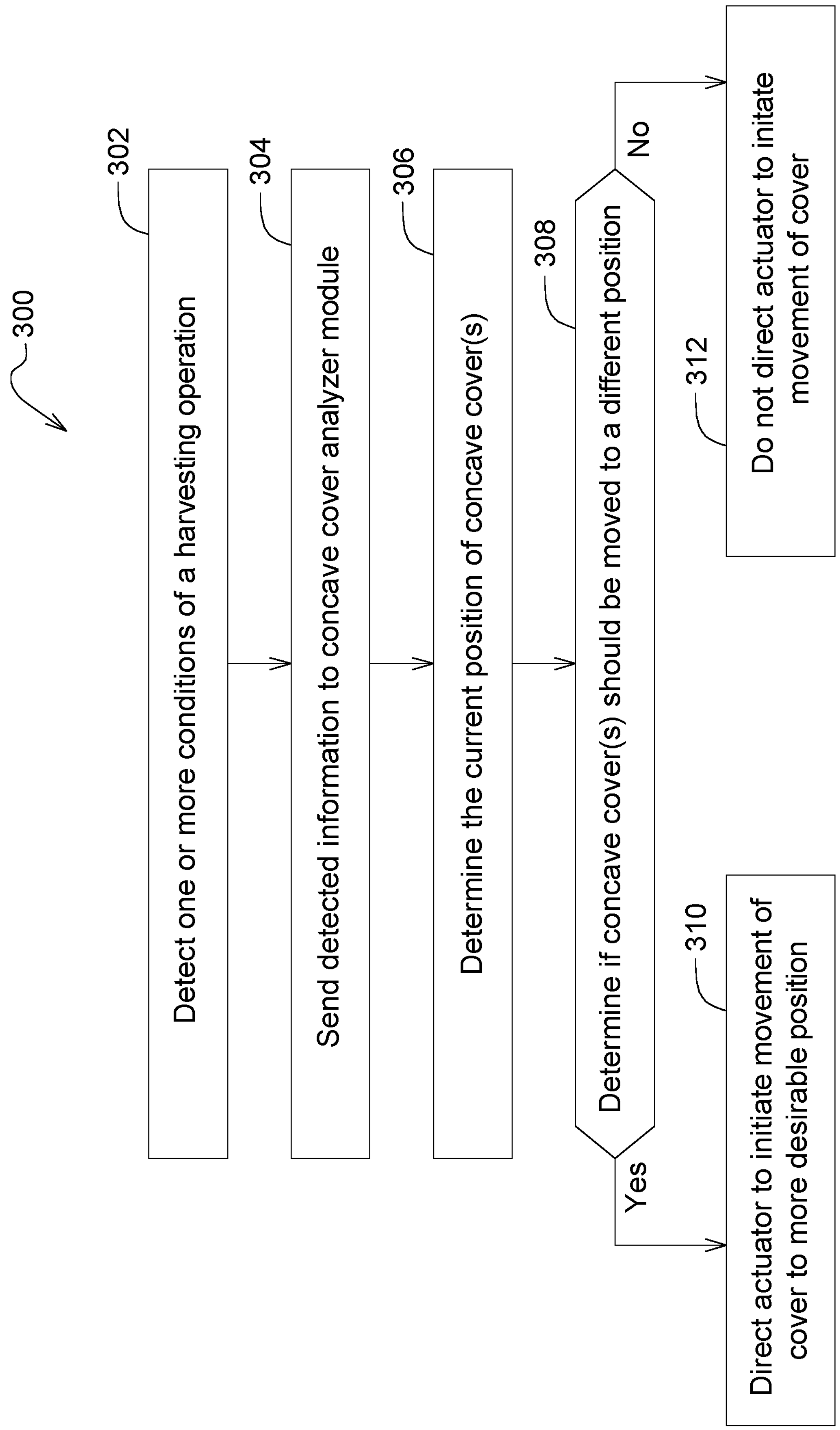
FIG. 6 is a flowchart of an embodiment of a method of the present invention.

Referring now to FIG. 6, a flow chart describing one embodiment of a method 300 of the present invention is shown. The method 300 may be carried out by the control system 200 described above. In a first action 302 of the exemplary method, one or more conditions of a harvesting operation may be detected, such as by sensors 208, including but not limited to sensors 228, 230, 232, 234, 236, 238, 240, 242, 244, 246, 248, 250, 252, 254, 256. In another action 304 of the exemplary method, the control system 200 may send the one or more detected conditions to the concave cover analyzer module 222. As noted above, in some embodiments, the detected information may first be interpreted by a monitor system module 220. In another action 306, the analyzer module 222 may determine a current position of one or more concave cover(s). In yet another action 308, the analyzer module 222 may determine if the one or more concave cover(s) should be moved to a different position. If yes 310, the controller 202 may instruct the actuator(s) 226 of one or more cover(s) to initiate movement of the cover(s) to a more desirable position. If no 312, the controller 202 will not instruct the actuator(s) 226 to change the cover position(s).

As noted above, one or more of several sensors may detect information relevant to the analysis performed by the concave cover analyzer module 222. Such information may be stored as sensor data 210 in the memory 206 and/or database 216. The memory 206 further stores concave cover analyzer module instructions 218 for determining whether to initiate movement of one or more covers by the one or more actuator(s) 226.

The control system 200 may include at least one unthreshed grain sensor 228. Unthreshed grain is grain that is still at least partially attached to one or more other components of the plant (e.g. corn kernels still on an ear, soybeans still in a pod) and is therefore not completely threshed. The sensors related to unthreshed grain may be related to one or more grain quality systems on the harvester 100. In such a system, at least one sensor is configured to detect the quality of grain in the clean grain section, such as the clean grain tank. In other embodiments, an unthreshed grain sensor may be located in a tailings section and/or residue handling section. In some embodiments, such sensor (s) may be visual-based sensors, including image sensors that capture images. Such image sensors may include, but are not limited to, a camera (e.g., mono camera and stereo camera), radar (such as Doppler radar), lidar, and other devices and technologies operable to capture an image or otherwise detect the quality of grain. In some embodiments, the monitor system module 220 is configured to analyze the input from the at least one unthreshed grain sensor 228, such as an image, to determine whether any of the grain in the image is unthreshed and, if so, how much. The monitor system module 220 output is then sent to the concave cover analyzer module 222, which may analyze a plurality of variables, including but not limited to a current position of the concave cover(s) and information from all sensors (in embodiments including a plurality of sensors). The presence of unthreshed grain may indicate that the cut crop material should stay in the threshing section 116 for a longer period of time and/or be subjected to increased threshing aggressiveness via an adjustment in rotor speed. As such, the concave cover analyzer module 222 may direct one or more covers to a closed or more closed position via one or more actuators 226.

In addition, the quality of the threshed grain may be analyzed. Accordingly, the control system 200 may include one or more grain quality sensors 256. These sensor(s) 256 may also be related to one or more grain quality systems on the harvester 100. In some embodiments, one or more grain quality sensors 256 may be configured to detect broken grain. Broken grain may indicate that the cut crop material is retained in the threshing section 116 for too long and/or subjected to threshing that is too aggressive, resulting in overthreshed grain. As such, the concave cover analyzer module 222 may direct one or more covers to the open position or a more open position via one or more actuators 226.

The control system 200 may include one or more tailings sensors 232. At least some grain that is not completely threshed and/or not completely cleaned in the cleaning section 124 may be transported by the tailings elevator 140 to the threshing section 116 or another tailings processing section (not shown) for further threshing. Tailings sensor(s) 232 may be configured to detect at least one characteristic of tailings, including but not limited to the presence of tailings, the level of tailings, and/or the content of the material in the tailings system. In some embodiments, such a sensor may be located at or in proximity to the tailings elevator 140. With respect to the content of the tailings, the material in the tailings may include unthreshed grain and non-grain material having similar properties to grain. If there is a large amount of unthreshed grain in the tailings, it may be necessary to subject cut crop material to the threshing section 116 for a longer period of time and/or to increased threshing aggressiveness. In that situation, the concave cover analyzer module 222 may direct the actuator(s) 226 to close or partially close one or more covers. If there is a large amount of material that is not grain (e.g., chaff or material other than grain ("MOG")), then that can indicate that the cut crop material has been subjected to the threshing section 116 for too long because non-grain material is being over-processed to material that is similar in size and/or other properties to grain. In that situation, it may be advantageous for the concave cover analyzer module 222 to direct the actuator(s) 226 to open or partially open one or more covers.

One or more sensors may be configured to provide input related to grain loss in one or more locations of the harvester 100. For example, the control system may include one or more separator loss sensor(s) 230. Separator loss refers to grain that enters the separating section 122 but does not enter the cleaning section 124. This material may exit the back of the separating section 122 with residue. Whether the concave cover analyzer module 222 directs one or more actuators 226 to move one or more cover(s) to an open, partially open, or closed position may depend on the type of loss. If the loss is due to grain that is unthreshed, then closing one or more covers to increase the period of time during which grain is threshed, or otherwise increasing threshing aggressiveness, may be advantageous. However, if the loss is due to grain that is broken and/or overthreshed, then opening one or more covers to decrease the period of time during which grain is threshed, or otherwise decreasing threshing aggressiveness, may be advantageous. In some embodiments, one or more cleaning shoe loss sensors 252 may be configured to provide input related to cleaning shoe loss. The cleaning shoe loss sensors 252 may be the same sensors as those configured to provide input regarding separator loss or they may be different sensors. In some cases, cleaning shoe loss can be the result of the concave cover position. For example, cleaning shoe loss may be caused by too much chaff being dumped into the cleaning shoe 124 when the concaves and/or rotor are overprocessing or overthreshing the crop material, which creates large amounts of small particles that overwhelm the cleaning shoe 124. If the sensor(s) 252 indicate this is occurring, then opening one or more covers may be advantageous.

One or more sensors may relate to material produced by the combine that is not grain. For example, one or more residue sensors 246 may detect information related to the residue produced by the harvester 100. In some embodiments, the residue sensor(s) 246 may detect the characteristics of the residue. As noted above, residue is the material that is discharged back onto the field after processing by the harvester 100. One or more residue sensors 246 may detect characteristics including, but not limited to, the length of the residue, the content of the residue, and/or the width of the discharged material. Based on the characteristics of the residue, the concave cover analyzer module 222 may determine that the threshing action is either too aggressive or not aggressive enough. Accordingly, the concave cover analyzer module 222 may direct one or more actuators 226 to open or close one or more concave covers to open, closed, or partially open positions as necessary. In addition to residue, the operations of the harvester 100 may also produce dust. One or more dust sensors 250 may detect the amount of dust produced by the harvester 100. Creation of large amounts of dust may indicate overthreshing. In such a situation, the concave cover analyzer module 222 may direct one or more actuators 226 to open one or more covers to shorten the duration of threshing or to otherwise reduce the aggressiveness of the threshing.

One or more sensors may relate to the crop that is being harvested at a particular time. For example, one or more crop moisture sensors 234 may detect the level of moisture in the crop being harvested at a particular time. Grain on plants having higher moisture contents may not detach as easily. Therefore, it may be necessary to subject such plants to the threshing section 116 for a longer period of time, or to otherwise increase threshing aggressiveness. Accordingly, the analyzer module 222 may direct the actuators 226 to close or partially close one or more covers when crop moisture sensor(s) 234 detect crop with high moisture levels. In other examples, one or more plant health sensors 244 may detect information related to plant health of the plants being harvested at a particular time. For example, grain typically detaches more easily from plants that have died. It may be advantageous to subject such plants to the threshing section 116 for a shorter period of time, or to otherwise decrease threshing aggressiveness. Accordingly, the concave cover analyzer module 222 may direct the actuators 226 to open one or more covers when the plant health sensor(s) 244 detect that the plants have died. In some embodiments, one or more crop mechanics sensors 242 may relate to the mechanics of the plants to be harvested, including but not limited to mechanics characteristics that may make the plants more difficult to thresh. In some embodiments, crop mechanics sensor(s) 242 may be located in advance of the threshing section 116 and detect information to be sent to the concave cover analyzer module 222 that will influence whether the concave cover analyzer module 222 directs the actuator(s) 226 to open or close one or more covers.

One or more sensors may relate to the field from which the crops are being harvested. For example, one or more terrain sensors 238 may detect whether the terrain of the field is level. When the harvester 100 is on terrain that is not level, cut crop material may not be distributed evenly in the threshing section 116. As such, threshed crop material may not evenly exit the threshing section 116 through the concave 154. In such a situation it may be desirable for the concave cover analyzer module 222 to direct the actuator(s) 226 to open or close one or more covers, either fully or partially, to result in more even distribution of the crop in the threshing section 116 and moving through the concave 154.

Further, in some embodiments one or more weed sensors 236 may detect one or more characteristics of a weed or other non-crop plants in the field as the crop is harvested, including but not limited to the presence and/or level of weeds or other non-crop plants in the field and the type of weed or other non-crop plant. Such a sensor(s) may detect the level of weeds in the crop as it is cut and/or gathered by implement 104 and/or such sensor(s) may detect the level of weeds in the crop material that is in the harvester body 102. Weeds typically have a higher moisture content than the crop to be harvested. The moisture can lead to cut crop material sticking together in the threshing section 116. As such, when harvesting a field or portions of a field with higher weed content, it may be advantageous to keep the cut crop material in the threshing section 116 for longer periods of time or to otherwise increase threshing aggressiveness. Accordingly, the concave cover analyzer module 222 may direct the actuator(s) 226 to close one or more covers, either fully or partially.

In some embodiments, one or more coverage area sensors 254 may detect information about the portion of the field over which the harvester is traveling, sometimes called the coverage area. Such sensor(s) may be independent or may be part of a global positioning system (GPS) system of the harvester, which may work in combination with other harvester information to create a coverage map based on where the harvester is driving, such as when the harvester is in a harvest mode. In some parts of some fields, the harvester does not interact with the same amount of crops to be harvested. For example, in fields that are not square, the headlands may be at an angle to the harvesting rows, which will cause the harvester to exit some rows on one side before the other side. Furthermore, not all fields include rows that are exact multiples of an implement width. As such, the harvester may travel a path that includes less than a full implement width of crops. As such, different amounts of material may enter the harvester 100. The concave cover analyzer module 222 may direct the system to open or close one or more covers, either fully or partially, to balance the harvester 100 and/or threshing section 116 if there is a change in the amount of material expected to enter the harvester 100. Directing the actuator(s) 226 to open and/or close one or more covers, either fully or partially, may help the harvested material thresh appropriately in such situations.

One or more feedrate sensors 240 may relate to the feedrate of material entering the harvester 100. One or more feedrate sensors 240 may be at any point upstream of the threshing section 116 and/or at the beginning of the threshing section 116. In nonlimiting examples, such sensors may be located on the implement 104, at the feeder house 112, and/or at the feed accelerator 114. In other embodiments, forward looking sensors (e.g. cameras, LiDAR, radar) that are configured to sense how much crop will come into the machine may be used. Moreover, in some embodiments, the harvester may implement one or more prediction methods that predict changes in feedrate. In some embodiments, as more material enters the harvester 100, threshing aggressiveness will naturally increase as the material itself may contribute to the threshing action. Therefore, it may be advantageous for the concave cover analyzer module 222 to direct actuator(s) 226 to open one or more covers or to otherwise reduce the threshing aggressiveness of the harvester.

In some embodiments, one or more ambient condition sensors 248 may relate to the ambient conditions at the time of harvest. For example, one or more ambient condition sensors 248 may detect the humidity of the ambient air and/or dewpoint of the ambient air. As described above, increased moisture can make plant material more difficult to thresh. As such, increased ambient air moisture may make threshing cut crop material more difficult. Accordingly, in some embodiments, the concave cover analyzer module 222 may direct actuator(s) 226 to open or close one or more covers in response to ambient air conditions, such as those related to air moisture.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A harvesting machine, comprising:

a) a threshing section including a rotor, a concave, and at least one concave cover movable between at least two positions; and b) an electronic control system including at least one sensor, at least one processor, at least one memory, and at least one actuator, the electronic control system operable to:

i) receive information from said at least one sensor, ii) determine which of said at least two positions said concave cover is in, iii) determine whether to move said concave cover to another of said at least two positions based on said information received from said at least one sensor, and iv) if it is determined to move said concave cover to another of said at least two positions, direct said at least one actuator to initiate movement of said concave cover; and wherein said sensor is selected from the group consisting of an unthreshed grain sensor configured to detect unthreshed grain, a tailings sensor configured to detect at least one of the content or amount of tailings, a weed sensor configured to detect a characteristic of one or more weeds in a crop, a feedrate sensor configured to detect the feedrate of a material entering the harvesting machine, a residue sensor configured to detect at least one characteristic of a residue produced by the harvesting machine, a dust sensor configured to detect at least one characteristic of a dust produced by the harvesting machine, and a coverage area sensor configured to detect at least one characteristic of an area to be harvested by the harvesting machine.

2. The harvesting machine of claim 1, further comprising at least one sensor selected from the group consisting of:

a) a terrain sensor configured to detect at least one characteristic of a terrain over which the harvesting machine is traveling;

b) a cleaning section loss sensor configured to detect at least one characteristic of grain lost in the cleaning section;

c) a grain quality sensor configured to detect at least one characteristic of grain in the clean grain section.

3. The harvesting machine of claim 1, further comprising at least one sensor selected from the group consisting of:

a) a separator loss sensor configured to detect at least one characteristic of grain lost in the separating section;

b) a crop moisture sensor configured to detect the amount of moisture in said plurality of crop plants to be harvested;

c) a crop mechanics sensor configured to detect at least one characteristic of the mechanics of said plurality of crop plants to be harvested;

d) a plant health sensor configured to detect at least one characteristic of the health of said plurality of crop plants to be harvested; and e) an ambient condition sensor configured to detect at least one characteristic of the ambient conditions during a harvesting operation.

4. The harvesting machine of claim 1, wherein said at least one processor comprises:

a) a monitor system module configured to interpret information received from said at least one sensor; and b) a concave cover analyzer module configured to determine whether to move said concave cover to another of said at least two positions based on interpreted information from said monitor system module.

5. The harvesting machine of claim 1, wherein a speed of said rotor is adjustable.

6. The harvesting machine of claim 5, wherein said at least one processor comprises:

a) a rotor speed analyzer module configured to determine whether to adjust the rotor speed based on information received from said at least one sensor.

7. The harvesting machine of claim 6, wherein said at least one processor further comprises:

a) a monitor system module configured to interpret information received from said at least one sensor; and b) a concave cover analyzer module configured to determine whether to move said concave cover to another said at least two positions based on interpreted information from said monitor system module; and wherein an aggressiveness of said threshing section may be adjusted by at least one of moving said concave cover and adjusting said rotor speed.

8. The harvesting machine of claim 1, further comprising a clean grain section and wherein said unthreshed grain sensor is located in said clean grain section.

9. The harvesting machine of claim 1, further comprising a concave clearance between said rotor and said concave and wherein said electronic control system is operable to determine whether to adjust said concave clearance based on said information received from said at least one sensor.

10. A computer-implemented method of controlling a concave cover of a harvesting machine performing a harvesting operation, said concave cover movable between at least two positions, the method comprising:

a) detecting one or more conditions of said harvesting operation;

b) determining a current position of said concave cover;

c) determining whether to move said concave cover to a different position based on the detected conditions; and d) if it is determined to move said concave cover to a different position, directing an actuator to execute movement of said concave cover;

e) wherein said conditions are selected from the group consisting of:

i) unthreshed grain, ii) a characteristic of tailings in a tailings system of said harvesting machine, iii) a characteristic of one or more weeds in a crop, iv) a feedrate of material into said harvesting machine, v) a characteristic of a residue produced by said harvesting machine, vi) a characteristic of a dust produced by said harvesting machine, and vii) a coverage area to be harvested by said harvesting machine.

11. The computer-implemented method of claim 10, wherein said conditions further include at least one condition selected from the group consisting of:

a) a terrain over which said harvesting machine is traveling;

b) a characteristic of grain lost in a cleaning section of said harvesting machine; and c) a quality of threshed grain in a clean grain system.

12. The computer-implemented method of claim 11, wherein said conditions further include at least one condition selected from the group consisting of:

a) a characteristic of grain lost in a separating section of said harvesting machine;

b) a moisture content of a crop;

c) a mechanical characteristic of a crop;

d) a health characteristic of a crop; and e) an ambient condition at a time of harvest.

13. The computer-implemented method of claim 10, wherein said harvesting machine includes a rotor configured to thresh cut crop material.

14. The computer-implemented method of claim 13, wherein the method further comprises:

a) determining a current rotor speed; and b) determining whether to change said rotor speed based on the detected conditions.

15. The computer-implemented method of claim 14, wherein a threshing aggressiveness of said harvesting machine is changed by one or more of changing said concave cover position and changing said rotor speed.

16. The computer-implemented method of claim 13, wherein said harvesting machine includes a concave clearance between said rotor and a concave, the method further comprising:

a) determining a current concave clearance; and b) determining whether to change said concave clearance based on the detected conditions.

17. The computer-implemented method of claim 16, wherein a threshing aggressiveness of the harvesting machine is changed by changing said concave clearance.

* * * * *